United States Patent [19]
Allen

[11] Patent Number: 5,784,761
[45] Date of Patent: Jul. 28, 1998

[54] VEHICLE LOAD RETAINER

[76] Inventor: Paul Dean Allen, 4620 North Ave., Sacramento, Calif. 95821

[21] Appl. No.: 722,630

[22] Filed: Sep. 27, 1996

[51] Int. Cl.⁶ .................................................. B60P 7/16
[52] U.S. Cl. ........................ 24/16 R; 410/96; 410/97; 24/442; 206/597
[58] Field of Search .................................. 410/96, 97, 98, 410/99, 117, 118; 24/306, 16 R, 442; 206/386, 597; 53/399, 441, 461, 447; 108/55.1

[56] References Cited

U.S. PATENT DOCUMENTS

| | | | |
|---|---|---|---|
| 3,173,539 | 3/1965 | Looker | 410/97 |
| 3,312,181 | 4/1967 | Davidson | 410/97 |
| 3,947,927 | 4/1976 | Rosenthal | 24/16 R X |
| 3,994,048 | 11/1976 | Rosenthal | 24/81 SK |
| 4,868,955 | 9/1989 | Magnant et al. | 24/306 |
| 4,876,841 | 10/1989 | Jensen | 53/399 |
| 4,884,686 | 12/1989 | Dupuis | 206/597 X |
| 4,937,920 | 7/1990 | Tsai | 24/3 |
| 5,061,130 | 10/1991 | Gadow | 410/104 |
| 5,193,955 | 3/1993 | Chou | 410/100 |
| 5,479,681 | 1/1996 | Muraoka | 24/16 R |
| 5,603,591 | 2/1997 | McLellan | 410/97 |

*Primary Examiner*—Stephen T. Gordon
*Attorney, Agent, or Firm*—Bielen, Peterson & Lampe

[57] ABSTRACT

A load retainer useable with tie down lines on a vehicle. The retainer includes a flexible body having first and second end portions and an intermediate end portion between the first and second end portions. Sites on the flexible body are intended for engaging the tie down lines. The flexible body is also adjustable along a certain dimension to permit the flexible body to fit around a load. The adjustment means includes a first flap, anchor place, and fastener for the first flap and anchor.

5 Claims, 2 Drawing Sheets

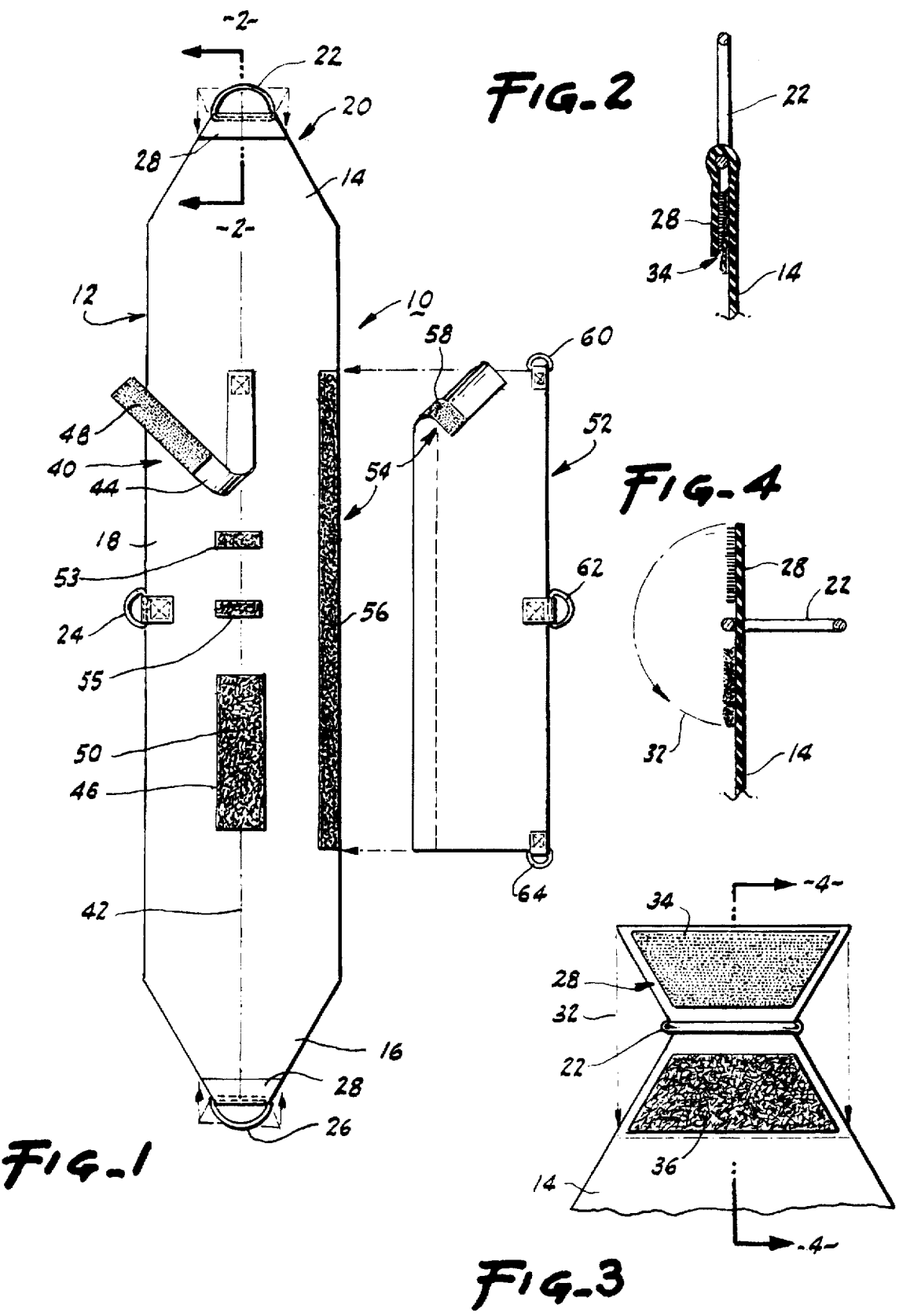

VEHICLE LOAD RETAINER

CROSS-REFERENCES TO RELATED APPLICATIONS

This present application is a substitute for application Ser. No. 08/521.881, filed 31 Aug. 1995 and now abandoned.

BACKGROUND OF THE INVENTION

The present invention relates to a novel and useful load retainer for a vehicle.

Cargo confining systems have been devised to hold items which are stacked on a deck or bed with or without the use of pallets. For example, such systems are shown in U.S. Pat. Nos. 3,173,539; 4,868,955; 4,876,841; 5,061,130; 5,193,955; and 5,479,681.

Although prior cargo retaining systems are adequate for conventional cargo, hazardous cargo has had special problems, as is the case of acid containing batteries. Conventional methods of containing such a cargo is to palletize the stacked batteries and shrink wrap a plastic material over the batteries. However, where multiple stops are made with such cargo, rewrapping with shrink wrapped material is required after loading or unloading of a portion of the cargo.

In addition, a locking mechanism has been devised where a cover is held to the hazardous cargo and is ratcheted in place. Unfortunately, movement and flexing of a vehicle causes such system to loosen. In addition, there is a possibility that a spark may be generated by metallic members in that system, which could cause a fire or explosion.

Other systems have been employed in which the hazardous material is loaded in a box. This box containing system has failed constantly due to the bouncing of the vehicle, which causes the spilling of cargo including battery acid. Once this has occurred, the load may require disposal by special handling methods.

A load retainer useable with at least one tie down line which is particularly adaptable to the transportation of hazardous material would be a notable advance in the transportation field.

SUMMARY OF THE INVENTION

In accordance with present invention a novel and useful load retainer is herein provided.

The retainer of the present invention utilizes a flexible body which is in the form of a flattened and stretchable (resilient) element. The flexible body includes a first end portion, a second end portion, and an intermediate portion therebetween. The flexible body may be constructed of materials which are resistant to corrosive chemicals such as acid. The flexible body first and second end portions may be fitted with loops or rings to permit engagement with tie down lines, which also may be resilient elements. In this regard, such loops or rings may function as means intended for engaging the flexible body to a tie down line employed with this system. It should be noted that the engaging means may be found on various portions of the flexible body as needed.

Adjustment means for compressing a dimension of the flexible body is also deemed to be part of the present invention. The adjustment means may take the form of a first flap, a second flap, and means for fastening the first and second flaps together. Such fastening means may take the form of hook and pile fasteners, snaps, buckles, and the like. Thus, the flexible body may be shortened to adjust to changing load dimensions heretofore discussed.

In certain cases, the first and second end portions may be constructed with projections. Each of the projections are capable of turning or folding toward the flexible body first or second end portion to form a closed loop, which may hold a ring. Means may also be found with respect to the first and second projections for connecting the same to the flexible body. Again, such connecting means may take the form of hook and pile fasteners, ties, and the like.

In certain embodiments of the present invention, a flexible flange is provided which is attached to the flexible body by extension means. Such extension means may take the form of a strip of fastening material along an edge portion of the flexible body, which attaches to fastening means along an edge of the flexible flange. Such fastening means may also be formed of hook and pile fastening material. Also, the flexible flange may be a resilient member and include stretching qualities that are commensurate with the flexible body. Thus, the flexible flange and extension means provides a lateral extension of the flexible body to increase its size when the load of hazardous material has increased. Consequently, when the load of hazardous material does increase in size, it is not necessary to detach the flexible body and realign it with the change in cargo configuration. Firm support of the larger cargo is easily achieved by the use of such flexible flange and extension means.

It may be apparent that a novel and useful load retainer system has been herebefore described.

It is therefore an object of the present invention to provide a load retainer which is versatile in usage and easily adjustable to cargo which is changeable in size.

Another object of the present invention is to provide a load retainer which is particularly adaptable to usage with hazardous material cargos.

Yet another object of the present invention is to provide a load retainer which may be easily constructed of materials that are resistant to corrosive chemicals.

A further object of the present invention is to provide a load retainer which is adjustable and expandable in surface area in multiple directions to provide maximum engagement of a cargo load on a vehicle.

A further object of the present invention is to provide a load retainer which eliminates plastic shrink wrapping of hazardous material cargos during loading and/or off loading of hazardous materials during multi-stop operations.

The invention possesses other objects and advantages especially as concerns particular characteristics and features thereof which will become apparent as the specification continues.

BRIEF DESCRIPTION OF THE DRAWINGS

FIG. 1 is a top plan view of the present invention including the flexible flange employed as an extender to the flexible body portion thereof.

FIG. 2 is an enlarged sectional view taken along line 2—2 of FIG. 1.

FIG. 3 is an enlarged plan view of the first end portion of the flexible body depicted in FIG. 1

FIG. 4 is a sectional view taken along line 4—4 of FIG. 3.

Figure 7:
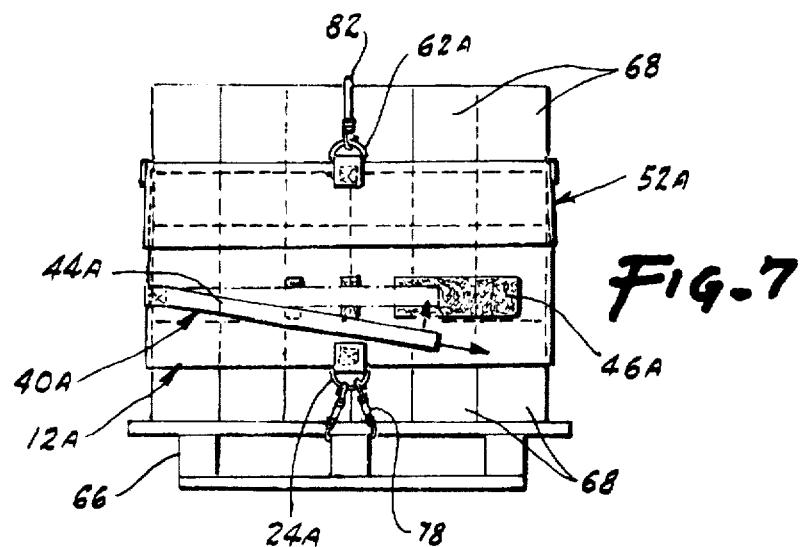
FIG. 7 is an end view taken along line 7—7 of FIG. 5

For a better understanding of the invention, reference is made to the following detailed description of the preferred embodiments thereof which should be taken in conjunction with the prior described drawings.

DETAILED DESCRIPTION OF THE PREFERRED EMBODIMENTS

Various aspects of the present invention will evolve from the following detailed description of the preferred embodiments thereof which should be referenced to the hereinbefore described drawings.

The invention as a whole is depicted in the drawings by reference character 10. Retainer 10 includes as one of its elements a flexible body 12 having first end portion 14 and second end portion 16. Intermediate portion 18 connects to first and second end portions 14 and 16. Flexible member 12 may also be formed of a material having a memory, i.e., possess the quality of resilience. For example, the flexible member 12 may be formed of neoprene rubber, composite material, and the like. Means 20 is also provided for engaging or attaching flexible body 12 to a particular tie down line, which will be discussed hereinafter. Engaging means 20 includes D-rings 22, 24, and 26.

Turning to FIG. 2, the detail of end portion 14 is depicted in which D-ring 22 is held by projection 28 mounted with hook and pile fastener 30. FIGS. 3 and 4 are a further detail of projection 28 showing the rotation of projection 28 according to directional arrow 32. In this regard, hook portion 34 and pile portion 36 of hook and pile fastener 30 are depicted as separated in FIGS. 3 and 4. The structure depicted in FIGS. 2-4 is applicable to portions 16 and D-ring 26 held by projection 38 thereat.

Adjustment means 40 is also illustrated in FIG. 1. Adjustment means 40 is employed to compress the dimension of flexible body or member 12. In the embodiment shown in FIG. 1, adjustment means 40 shortens the length of flexible body 12 along axis 42. Adjustment means 40 includes flap 44 and anchor 46. Flap 44 includes hook material 48 which is capable of engaging pile material 50 on anchor place 46. Pile material tabs 53 and 55 maintain flap 44 against the intermediate portion 18 of flexible member 12 as an aid to adjustment means 40.

Flange 52, which may also be formed of flexible, resilient material, is used to extend flexible member 12 laterally. Flange 52 includes holding means 54 for attaching flexible flange 52 to flexible member 12. Holding means 54 may take the form of a strip of pile fastener 56 attached to intermediate portion 18 of flexible member 12, and a strip of hook fastener 58 sewn or otherwise attached to an edge of flange 52. Of course, hook and pile fasteners 56 and 58 are capable of interacting and holding flange 52 to flexible member 12. D-rings 60, 62, and 64 fasten to flexible flange 52 and serve as fastening points for tie down lines herein described.

Figure 6:
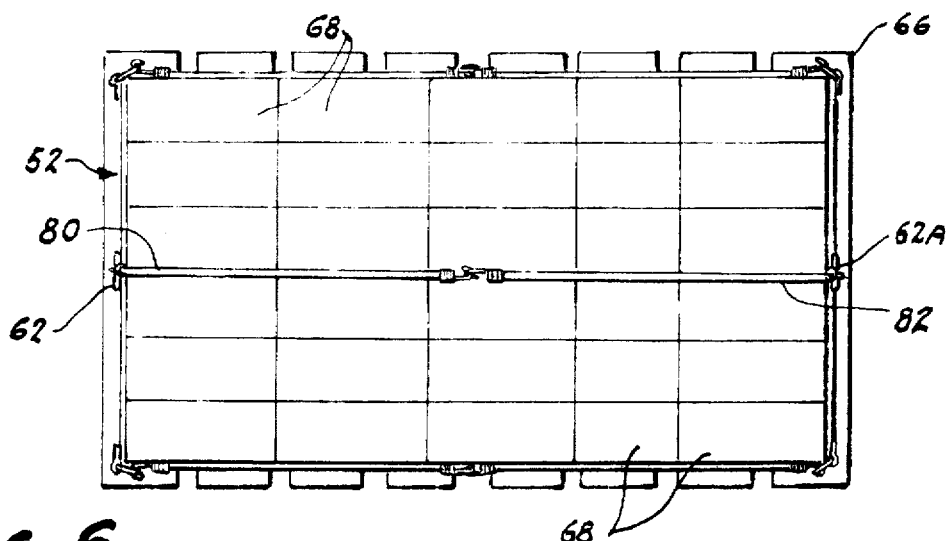
FIG. 6 is a top plan view of the retainer of the present invention in use on a palletized cargo.
Figure 5:
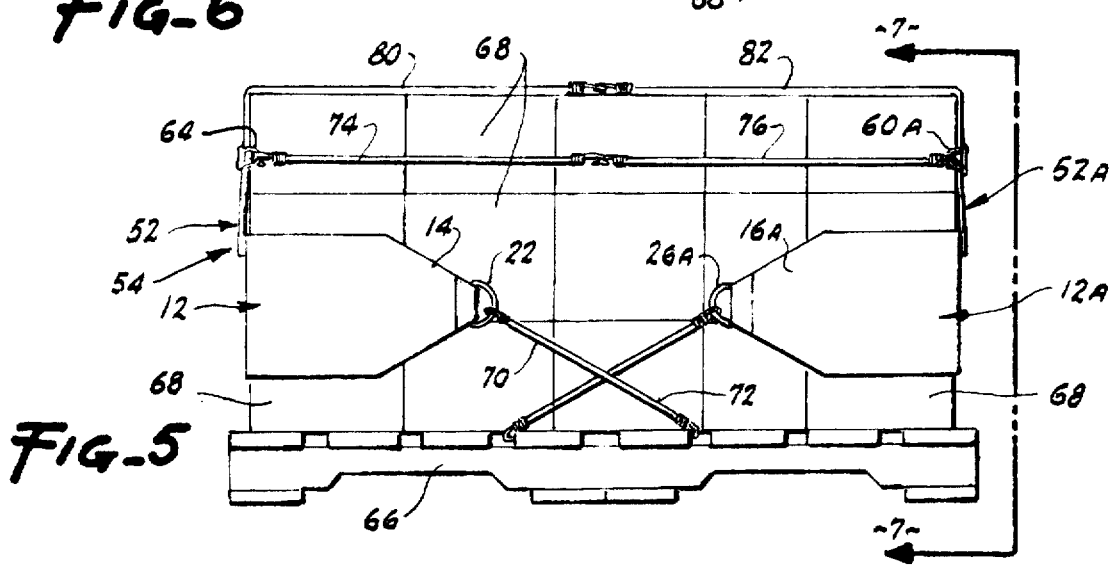
FIG. 5 is a side elevational view of the container of the present invention in use on a palletized cargo.

In operation, reference is made to FIGS. 5-7. FIG. 5 shows a palette 66 holding a plurality of stacked members 68 which serves as a cargo for a vehicle. Flexible member 12 is depicted with a like member 12A which extends around cargo 68. Tie down lines 70 and 72 connect to D-rings 22 and 26A on end portions 14 and 16A of flexible members 12 and 12A, respectively. A similar situation would occur on the opposite side of cargo 68 from that shown in FIG. 5. Flexible flange 52 is shown in its connected position relative to flexible member 12 by the employment of holding means 54. Likewise, a similar flange 52A having a D-ring 60A is depicted as being attached to flexible member 12A and tie down lines 74 and 76 interconnect D-rings 60A and 64. With reference to FIG. 7, it may be observed that adjustment means 40 is shown with respect to flexible member 12A. Flap 44A is shown as being stretched to engage anchor place 46A. A pair of tie down lines 78 holds D-ring 24A in place. Tie down lines 80 and 82 connect to D-rings 62 and 62A of flexible flanges 52 and 52A, respectively, across the top of cargo 68, FIG. 6. Thus, cargo 68 may be held in multiple directions and, most importantly, be adjustable through the use of resilient tie downs and retainer 10, which includes flexible and resilient members such as members 12 and 12A. Adjustment means 40 further provides for the cinching of flexible members 12 and 12A about cargo 68. Thus, retainer 10 is completely adjustable, which is especially useful when the bulk of cargo 68 changes if the vehicle is operating in a multiple stop and load operation.

While in the foregoing, embodiments of the present invention have been set forth in considerable detail for the purposes of making a complete disclosure of the invention, however, it may be apparent to those of skill in the art that numerous changes may be made in such details without departing from the spirit and principles of the invention.

What is claimed is:

1. A load retainer usable with at least one tie down line, comprising:

a. a flexible resilient body having a first end portion, a second end portion, and an intermediate portion connected to said first and second end portions;

b. means intended for selectively engaging said first and second end portions of said flexible resilient body to at least one tie down line, including a first projection extending from said first end portion, and means for connecting a portion of said first projection to the flexible body to form a first closed loop, and a second projection extending from said second end portion, and means for connecting a portion of said second projection to the flexible body to form a second closed loop;

c. adjustment means for compressing a dimension of said intermediate portion of said flexible resilient body, said adjustment means including a first flap, an anchor, and means for fastening said first flap to said anchor, said first flap and anchor connected to said flexible resilient body; and d. a flexible holding flange, and means for removably attaching said flexible holding flange to said intermediate portion of said flexible resilient body, for permitting said flexible holding flange to be completely removed from said flexible resilient body and to extend outwardly from said flexible resilient body to engage the load.

2. The load retainer of claim 1 in which said means for attaching said flexible flange to said intermediate portion includes a hook and pile fastener.

3. The load retainer of claim 2 in which said flexible flange is a resilient member.

4. The load retainer of claim 3 in which said means for removably attaching said flexible flange to said intermediate portion of said flexible resilient body includes an edge of said flexible flange and a portion of said hook and pile fastener placed along said flexible flange edge.

5. The load retainer of claim 1 wherein said means intended for selectively engaging further comprises a respective ring member held in each of said first and second closed loops.

* * * * *